United States Patent [19]

Crull

[11] 3,885,388
[45] May 27, 1975

[54] CONTROL FOR A HYDROSTATIC TRANSMISSION
[75] Inventor: Stanley W. Crull, Ames, Iowa
[73] Assignee: Sundstrand Corporation, Rockford, Ill.
[22] Filed: Feb. 13, 1974
[21] Appl. No.: 442,191

[52] U.S. Cl. .................. 60/444; 60/449; 60/490; 180/6.48; 180/6.3
[51] Int. Cl. ............................................. F16h 39/46
[58] Field of Search ............. 60/420, 421, 428, 429, 60/430, 431, 444, 449, 486, 487, 490; 180/6.48

[56] References Cited
UNITED STATES PATENTS

| | | | |
|---|---|---|---|
| 3,054,263 | 9/1962 | Budzich et al. | 60/490 X |
| 3,230,699 | 1/1966 | Hann et al. | 60/444 |
| 3,411,297 | 11/1968 | Hann | 60/444 X |
| 3,572,213 | 5/1969 | Lauck | 60/444 X |
| 3,800,535 | 4/1974 | Ward et al. | 60/427 |

Primary Examiner—Edgar W. Geoghegan
Attorney, Agent, or Firm—Wegner, Stellman, McCord, Wiles & Wood

[57] ABSTRACT

A control for a hydrostatic transmission which includes a horsepower control valve in the control circuit for controlling the speed of the hydrostatic transmission and which is responsive to the speed of the prime mover engine and which has additional pressure created forces applied to the shiftable valve of the horsepower control valve to keep the engine running at a constant or nearly constant speed, thus keeping engine horsepower constant and at a maximum value.

12 Claims, 8 Drawing Figures

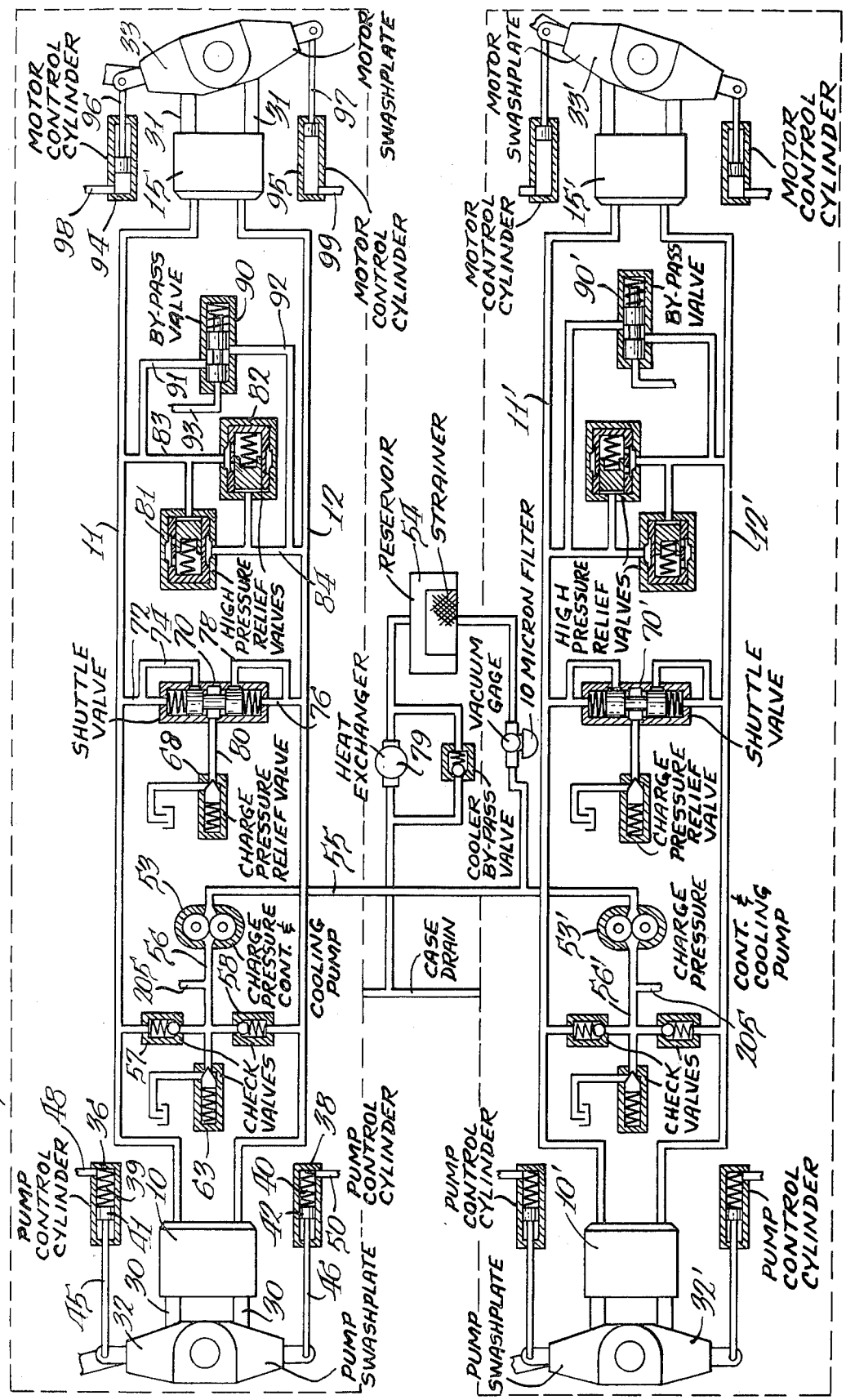

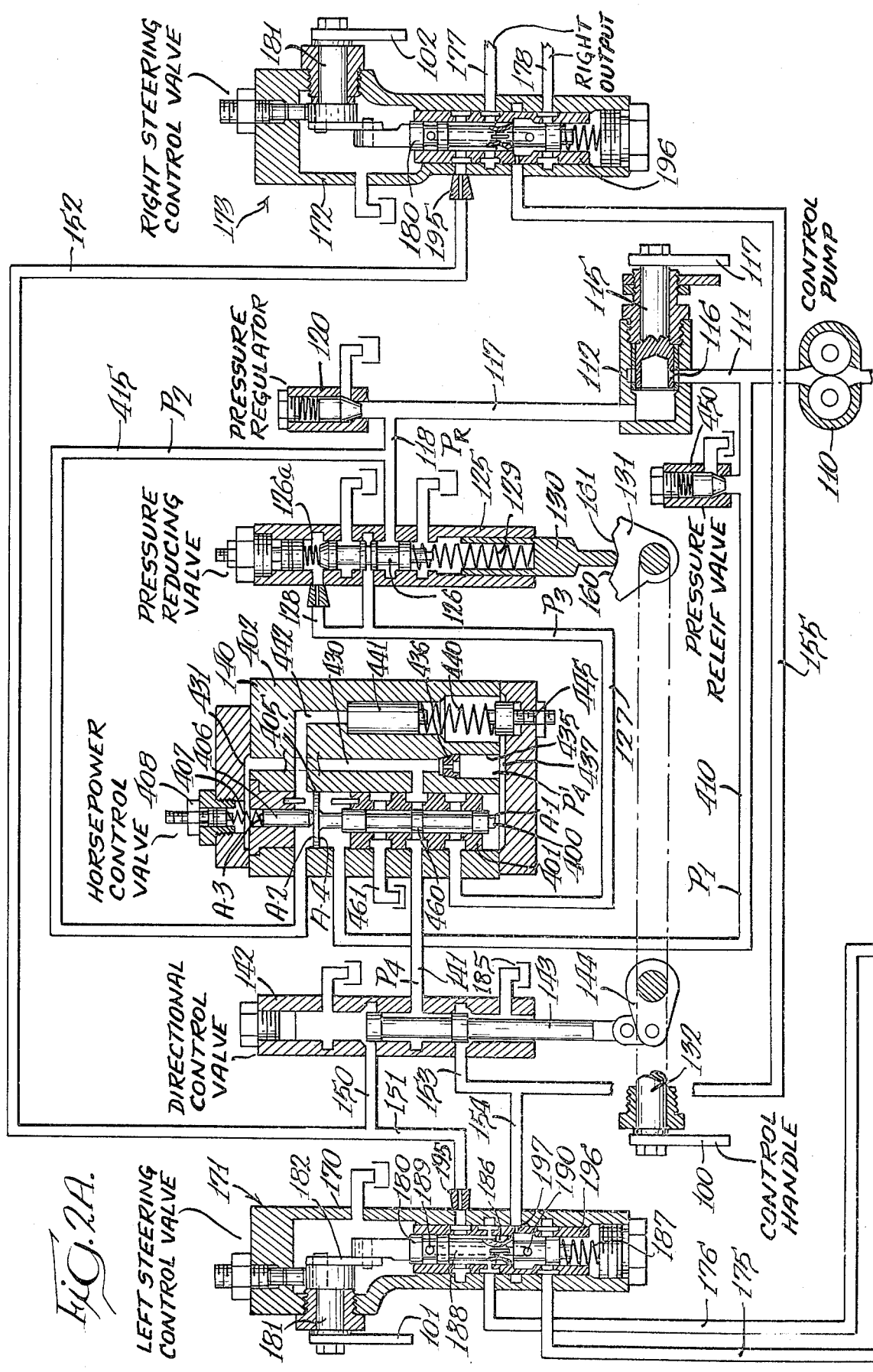

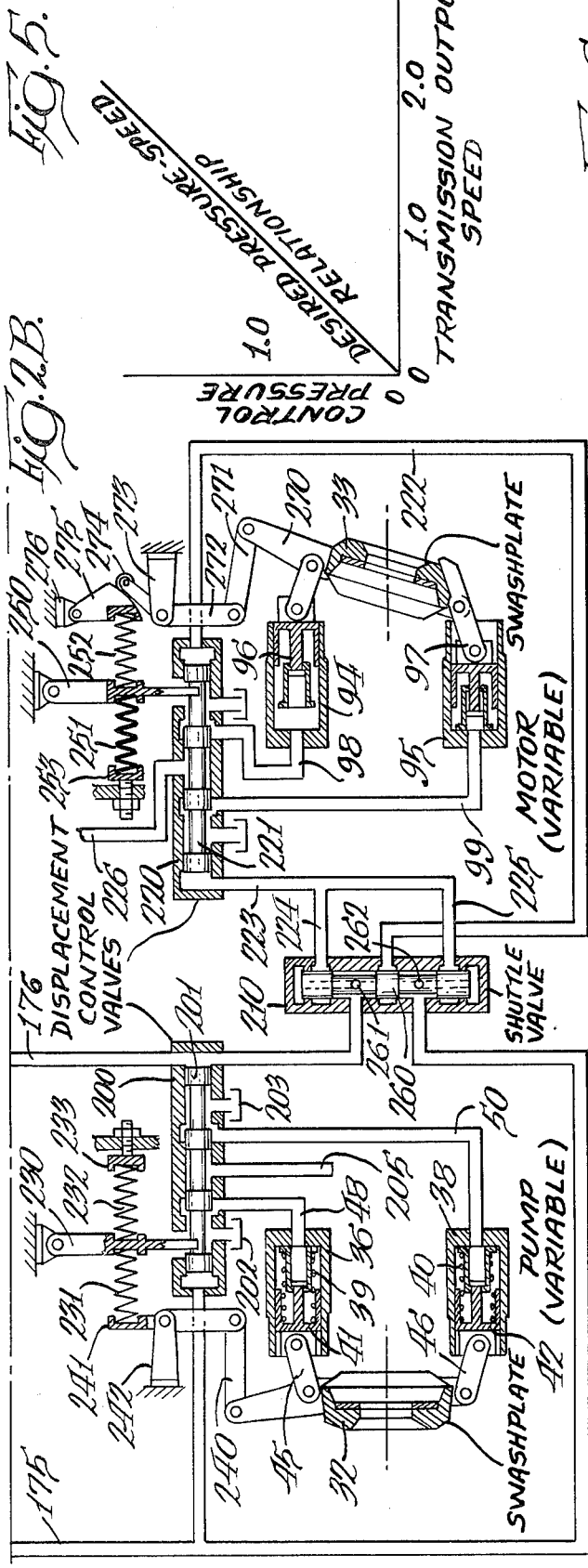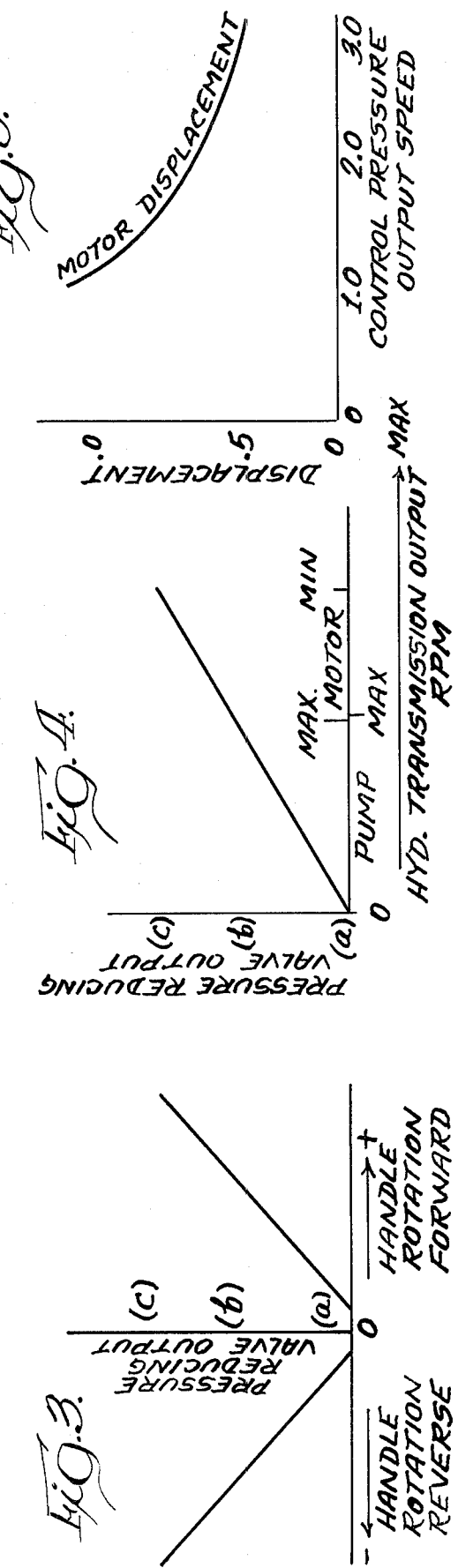

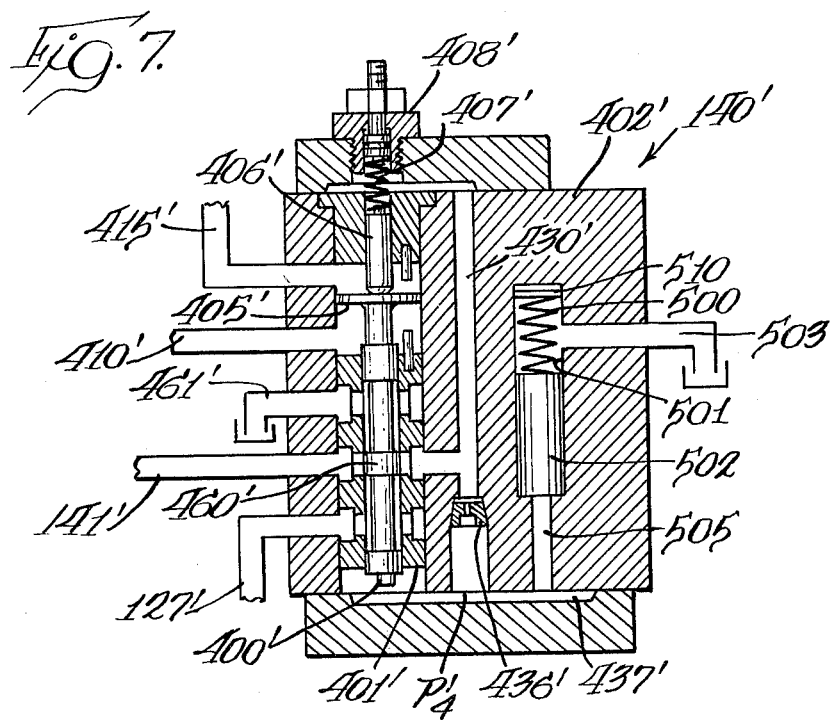

CONTROL FOR A HYDROSTATIC TRANSMISSION

BACKGROUND OF THE INVENTION

This invention pertains to a control for a hydrostatic transmission which functions to control the displacement of either a variable displacement pump or variable displacement motor of the hydrostatic transmission whenever the engine prime mover speed varies from a preset level in order to maintain engine horsepower constant at a maximum value.

The assignee of this application has filed substantially concurrently herewith an application of Donald J. MacIntosh and Edward L. Stout, Ser. No. 442,190, filed Feb. 13, 1974, and entitled "Hydrostatic Transmission Control", which discloses a dual-path hydrostatic transmission control wherein a master control circuit establishes a control pressure for setting the speed of the transmissions. The control includes a horsepower control valve subjected to a pressure representing actual engine speed and a regulated pressure for modifying the control pressure for the transmissions in order to prevent the stalling of the engine. The horsepower control valve disclosed therein did not provide complete stability, with resulting engine hunting for cycling and could be subject to uncontrollable variables as oil viscosity, oil temperature, and valve port tolerances particularly when the aforesaid valve was arranged for cross-porting and with resultant variable orificing to ports of the valve dependent upon the position of the valve spool.

The aforesaid, concurrently filed application also includes reference to a prior previous dual-path, hydrostatic transmission control wherein each of the two hydrostatic transmissions are mutually controlled by a separate control circuit with each control setting a control pressure for its respective transmission. This prior art dual-path, hydrostatic transmission control also had a horsepower or anti-stall control valve to prevent overloading of the prime mover engine. However, the horsepower control valve was subject to the same problems as the horsepower control valve referred to in the preceding paragraph.

A prior art Lauck U.S. Pat. Re. No. 27,488 discloses a control for hydrostatic transmission wherein the control includes an anti-stall control. A centrifugal foverner governor the speed of the prime mover engine and modifies the action of a valve through a mechanical linkage system to control the operation of the hydrostatic transmission. This patent does not have a horsepower control valve directly responding to pressure signals including a signal derived from actual engine speed and with additional pressure signals for providing improved stability of operation.

SUMMARY

A primary feature of the invention relates to an improved control for a hydrostatic transmission wherein the prime mover engine may be kept running at a constant or nearly constant speed to maintain horsepower constant at a maximum value.

In the invention, a horsepower control valve is included in the control circuit and is responsive to a pressure representing speed of the prime mover engine as well as a regulated pressure and also subject to a pressure as modified by the horsepower control valve to avoid effects from uncontrollable variables as oil viscosity, oil temperature, or tolerances in valve porting. Additionally, the pressure established by the horsepower control valve is applied to opposing areas of the valve spool of the horsepower control valve with a timing delay in a change of said pressure as applied to one of the areas to assist in retaining system stability while improving the accuracy of the steady-state engine speed.

In the delay of application of pressure change to one of said areas, this is accomplished by the use of an orifice and an accumulator whereby the size of the accumulator piston and the orifice may be varied in a particular control to determine an accumulator time constant which determines the time required for the system to reach a steady-state condition.

Additionally, the application of opposing pressures as set by the horsepower control valve enables a design variation in the areas subjected to said pressure whereby a selection of the area ratio can permit the engine to either run at constant speed regardless of the load imposed upon the system, cause the engine speed to drop as the load is applied, or cause the engine speed to rise as load is applied.

The horsepower control valve additionally includes adjustable means acting on the valve spool thereof in order to set the operating speed of the prime mover engine.

The control, as disclosed herein, provides for control of engine speed. However, it has the capability of functioning as a feedback controller for any desired system variable in a hydrostatic transmission system. The horsepower control valve senses the level of a pressure difference which varies, dependent upon engine speed and changes the pressure output from the horsepower control valve in a manner to correct this pressure difference to a preselected level. The valve spool could be subjected to pressure selected to enable control of transmission output speed or working pressure of the main transmission loop.

BRIEF DESCRIPTION OF THE DRAWING

FIG. 1 is a diagrammatic illustration of a dual-path hydrostatic transmission with two complete hydrostatic transmissions;

FIG. 2A is a diagrammatic view of a part of the control system for the dual-path hydrostatic transmission;

FIG. 2B is a diagrammatic view of the displacement controls for one of the hydrostatic transmissions and which connects into the left-hand side of FIG. 2A;

FIG. 3 is a graph illustrating the speed setting and direction of operation of the hydrostatic transmissions in response to positioning of the manual control handle;

FIG. 4 is a graph showing the staging action of the variable displacement pump and motor of a hydrostatic transmission;

FIG. 5 is a graph showing the desired linear relationship between control pressure and speed of a hydrostatic transmission;

FIG. 6 is a graph showing a non-linear relation between displacement of the motor of the transmission with respect to speed thereof in order to obtain a linear speed-control pressure relation; and FIG. 7 is a sectional view of an alternate form of the horsepower control valve.

DESCRIPTION OF THE PREFERRED EMBODIMENT

A dual path hydrostatic transmission is shown in FIG.

1. These transmissions, in one embodiment, may be used to each individually operate a track of a dual track vehicle. Referring to the hydrostatic transmission, illustrated in the upper half of FIG. 1, a variable displacement pump 10 is connected by a pair of lines 11 and 12 to a variable displacement motor 15. The variable displacement pump 10 has an input shaft (not shown) driven from a power source, such as the engine of the vehicle, with the motor 15 having an output shaft (not shown) connectable to a drive train, such as for a track of the vehicle.

Preferably, both the pump 10 and motor 15 are of the axial piston type having rotatable cylinder blocks, each with a plurality of cylinders in annular array and with pistons 30 and 31, respectively, having ends reciprocable in the cylinders. The pump 10 has a variable angle reversible swashplate 32 engaged by the projecting ends of the pistons 30 for initially controlling the speed of the transmission as well as the direction of rotation thereof. The motor 15 has a variable angle swashplate 33 movable from a maximum displacement position shown to a minimum displacement position somewhat greater than zero. The swashplate 33 engages pistons 31 causing reciprocation thereof and rotation of the cylinder block and the output shaft of the motor connected thereto as high pressure fluid is supplied to the motor from the pump.

A pair of pump control cylinders 36 and 38 are provided for positioning the pump swashplate 32. Each has a spring construction, indicated diagrammatically at 39 and 40, respectively, acting against pistons 41 and 42. The pistons 41 and 42 pivot the swashplate 32 through links 45 and 46 connected to the pistons. The control cylinders 36 and 38 position the swashplate in response to the supply of operating fluid to the cylinders by means of conduits 48 and 50, respectively. The centering springs 39 and 40 normally act through the pistons to position the pump swashplate as shown in its neutral position when no operating fluid is delivered through the conduits. In this position, there is no positive output from the pump. The control cylinders are of a conventional, single-action type so that the entry of fluid under pressure into one cylinder will cause the swashplate to tilt or pivot in one direction, and the influx of fluid under pressure into the opposite cylinder will cause reverse pivoting of the swashplate, thus permitting the flow from the pump 10 to reverse and, consequently, the output of the motor is reversed.

A positive displacement charge pressure pump 53 is provided and is driven through suitable means by the engine, or prime mover, of the vehicle or other device using the transmission. The pump 53 is in communication with a reservoir 54 through an intake conduit 55 and has a discharge conduit 56. The capacity of the charge pump 53 is sufficient to replace leakage fluid, and to supply operating fluid to a pair of control valves of the displacement control for the pump and motor (hereinafter described) and to supply cooling fluid to the hydrostatic transmission in excess of that required for the aforementioned purposes in order to maintain the transmission cool. Additionally, the pump develops a pressure sufficient whereby the force in the cylinders for positioning the swashplates of the pump and motor may exceed the forces tending to move the swashplate as created internally by the action of the pump and motor.

A pair of spring-biased check valve 57 and 58 are in communication with the conduit 56 and with the main lines 11 and 12, respectively, interconnecting the pump and the motor. The check valves 57 and 58 permit the supply of replenishing and cooling fluid to the low pressure side of the transmission circuit through one check valve while pressure in the high pressure line will maintain the other check valve closed. A spring-biased, make-up relief valve 63 communicates with the conduit 56 and serves to relieve excess fluid. A shuttle valve 70 is provided for establishing a circuit between one of the main lines 11 and 12 that is at low pressure and a low pressure relief valve 68. The shuttle valve is in communication with the lines 11 and 12 by means of the conduits 72, 74, 76, and 78 and provides a means for removing heated oil displaced by cooling oil supplied by the charge pump 53. The fluid pressure in the lines 11 and 12 acts through the conduits 72 and 76, respectively, to appropriately position the shuttle valve 70 so that communication is established from the low pressure relief valve through a conduit 80 to the low pressure side of the transmission circuit, by means of either the conduit 74 or the conduit 78, so that the heated fluid may be drained to the reservoir, passing through the heat exchanger 79. Shuttle valve 70 is spring-centered to a closed position so that during the transition of reversing of pressure in the main lines, none of the high pressure oil is lost from the circuit.

The transmission includes over-pressure relief valves 81 and 82 in communication with each of the main lines by the conduits 83 and 84. The valves serve to prevent abnormally high pressure in either of the two main lines 11 and 12 by relieving the circuit of surge pressures which may occur during rapid acceleration or abrupt braking. In response to this high pressure, the over-pressure relief valves shift to dump the excess oil to the low pressure side of the transmission circuit. For example, when excessive high pressure exists in line 11, fluid pressure in conduit 83 will cause the valve 81 to shunt the fluid to line 12 through the conduit 84.

A bypass valve 90 is connected into conduits 83 and 84 by a pair of conduits 91 and 92 and, by a conduit 93, is connected to the outlet of the charge pump 53. In the event of loss of pressure from the charge pump, the bypass valve shifts to connect conduits 91 and 92 and short-circuit the system to result in a free-wheeling condition of operation.

The motor 15 has a pair of operating cylinders 94 and 95 containing piston and link elements 96 and 97 pivotally connected to the swashplate 33 and with conduits 98 and 99 connected to their respective cylinders for delivery of operating fluid thereto.

The second hydrostatic transmission, shown in the lower half of FIG. 1, is of the same construction as that just described and is supplied with fluid from the reservoir 54 through the conduit 55. Corresponding structural elements of the second hydrostatic transmission have been given the same reference numeral with a prime affixed thereto.

The dual path control system is shown primarily in FIG. 2A and, more specifically, the master control circuit for setting the speed and direction of operation of the two hydrostatic transmissions shown in FIG. 1. FIG. 2A additionally shows a pair of branch circuits extending from the master circuit structure to provide steering capability. The control system is operated by means of three control handles. A control handle 100 is operable to set the speed and direction of operation. A control handle 101 is operable to establish a modification in speed of one transmission or direction of operation thereof for steering capability in one direction of turn and a third handle 102 is operable to control the speed and direction of operation of the other hydrostatic transmission for steering capability in the other direction of turn.

The master control circuit includes a control pump 110 suitably driven by a prime mover, such as an engine of a vehicle, to deliver control fluid used to establish a control pressure for the system. The output of the control pump 110 is directed through a conduit 111 to a variable orifice valve 112 having a rotatable member 115 with a variable orifice 116. The position of this valve is set through a connection 117 to the throttle linkage of the engine (not shown) to provide a pressure differential across the valve dependent upon the setting of the engine and with the variable orifice opening varying directly relative to the throttle setting. The pressure differential is constant for each engine setting at rated speed. The valve functions to signal speed of the engine and, thus, if the engine speed decreases from that normally obtained by the throttle setting, there is a lowered output flow from the control pump 110 which results in a lowering of the pressure differential across the variable orifice. A conduit 117 extends from the variable orifice valve 112 to a pressure regulator valve 120 which assures adequate back pressure downstream of the variable orifice valve 112 in order to operate the control system, and further provides a regulated constant pressure in a conduit 118 and which is designated $P_R$. The conduit 118 extends to a pressure-reducing valve 125 (ratio control valve), with this valve functioning to establish a control pressure for obtaining a uniform speed control of both hydrostatic transmissions. The pressure-reducing valve 125 includes a valve spool 126 which controls communication between the inlet conduit 118 and an outlet conduit 127. The valve spool 126, at one end, is subjected to outlet pressure therefrom through a conduit 128 having a flow restriction as well as an adjustable spring 126a and, at the opposite end, is acted upon by a spring 129. The spring is partially positioned within a cylindrical member 130 movable within the housing of the valve and having an end engageable by a speed-setting cam 131 connected to a shaft 132 which is rotatably positioned by the manually operable handle 100.

The cam 131 has a pair of oppositely-inclined cam surface sections 160 and 161 extending upwardly in opposite directions from the neutral portion of the cam which is shown in engagement with the member 130 in FIG. 2A. The control pressure fluid delivered from the pressure-reducing valve 125 by conduit 127 is directed to a horsepower control valve 140 which has, as a primary function, prevention of stalling of the prime mover, such as the engine of a vehicle, and, thus, also may be referred to as an anti-stall valve. A conduit 141 extends from the anti-stall valve to a directional control valve 142 having a valve spool 143 positionable by a linkage 144 operatively connected to the shaft 132 rotatably positionable by the manually-operable handle 100. The position of the valve spool 143 determines the normal direction of operation of the hydrostatic transmissions.

The foregoing structure shown in FIG. 2A constitutes the master control circuit whereby positioning of the handle 100 determines the normal direction of operation and a basic common and uniform speed for the two hydrostatic transmissions for straight ahead or straight reverse drive. A first outlet conduit 150 from the directional control valve 142 branches into a pair of conduits 151 and 152 leading to branch circuits associated, one with each of the hydrostatic transmissions. A second conduit 153, extending from the directional control valve, has two branch conduits 154 and 155 also extending to the respective hydrostatic transmissions. In the illustrated position of stem 143, line 141 is blocked and lines 150, 153 are drained.

When the shaft 132 is rotated from the position shown in FIG. 2A by force applied to the handle 100, the valve spool 143 of the directional control valve is shifted from the position shown to direct control pressure fluid at a set pressure to one of the conduits 150 and 153 and operates the transmissions in one direction, or flow may be directed to the other conduit causing operation in the opposite direction. The two sections 160 and 161 of the cam surface of cam 131 are mirror images of each other, whereby rotation of the shaft 132 in either direction will result in compressing of the spring 129 of the pressure-reducing valve 125 to an indentical degree to set a control pressure of a desired value for speed of operation of the hydrostatic transmissions.

The branch conduits 151 and 154 from the master control circuit connect to the housing 170 of a steering control valve, indicated generally at 171, while the corresponding branch conduits 152 and 155 connect into the housing 172 of a steering control valve, indicated generally at 173. The steering control valve 171 has a pair of conduits 175 and 176 extending therefrom and to the pump and motor displacement control shown in FIG. 2B. The steering control valve 173 has a similar pair of conduits 177 and 178 which extend to the displacement control (not shown) for the pump and motor of the other transmission. Each of the steering control valves is of the same construction, as are the displacement controls for the pump and motor of the hydrostatic transmissions and, therefore, the steering control valve 171 and the displacement control shown in FIG. 2B for the transmission shown in the upper part of FIG. 1 will be described in detail with the understanding that there is the same structure for the other hydrostatic transmission.

The control pressure signal is delivered to one or the other of the branch conduits 151,154, dependent upon the position of the directional control valve 142, with these conduits communicating with a bore in the valve housing 170 which movably mounts a valve spool 180. The position of the valve spool 180 is controlled by the handle 101, with the handle being connected to a rotatable shaft 181 which carries an eccentrically pivoted link 182 which is pivotally connected to the upper end of the valve spool 180. In the position of the valve, as shown in FIG. 2A, and assuming control pressure is supplied to branch conduit 151, the control pressure fluid enters the valve bore and, by flow around a reduced portion of the valve spool, flows to the conduit 176 leading to the displacement control. This supplies full control pressure to the displacement control. Supply of full control pressure provides for operation of the associated hydrostatic transmission at a desired speed, as determined by the setting of the control pressure by the pressure-reducing valve 125. In one direction of vehicle turning, the speed of the hydrostatic transmission associated with the steering control valve 171 is reduced. The handle 101 is operated to move the valve spool 180 downwardly, as shown in FIG. 2A, with the result that a certain amount of the control pressure fluid is metered or bypassed to the branch conduit 154 which connects to a tank port 185 associated with the directional control valve 142 because of the latter valve having its spool 143 in an upshifted condition from that shown in FIG. 2A. This reduces the control pressure to reduce the speed. This metering flow is across a land of the valve spool 180 which is provided with external slots 186 on the land which function as a variable orifice, with the slots increasing in size as the valve spool 180 is lowered from the position shown in FIG. 2A to gradually reduce the control pressure delivered through the conduit 176 to the displacement control. These slots do not extend for the full length of the land, whereby the land is continuous at the lower part thereof as viewed in FIG. 2A.

The valve spool 180 has two limit positions, with the upper limit position shown in FIG. 2A, and with an opposite limit position being in a full lowered position of the valve spool against the action of a spring 187 in the valve housing. In the fully-lowered position, there is a reversal of flow of the control pressure fluid with respect to output conduits 175 and 176 whereby direction of operation of the associated hydrostatic transmission is reversed. This action occurs by connecting an internal passage 188 in the valve spool 180 between the branch conduit 151 and the conduit 175 by means of a pair of radial openings in the valve spool which extend the internal passage 188 to the surface of the valve spool, with these openings being indicated at 189 and 190. This results in reversing the direction of operation of the associated hydrostatic transmission whereby a spin-turn of the vehicle will result, with the vehicle turning about an axis between the two tracks thereof.

If the directional control valve 142 is downshifted to obtain an opposite direction of operation of the hydrostatic transmission, then pressure is supplied to the branch conduit 154 leading to the steering control valve 171 and in the position of the latter valve, as shown in FIG. 2A, full control pressure is delivered through the conduit 175 leading to the displacement control. Similarly, the control pressure may be reduced by metering or bypass as the valve spool 180 is lowered by the slots 186 on the land of the valve spool and the direction of operation may be reversed by further downward movement of the valve spool 180 until the land having the slots 186 blocks the branch conduit 154 from the conduit 175 whereby the control pressure signal will then be delivered to the conduit 176 to obtain the opposite direction of operation of the hydrostatic transmission.

The magnitude of control pressure reduction depends upon the relative size of an orifice 195 in the branch conduit 151 and the porting characteristics of the valve 171. A sleeve 196 positioned in the bore of the valve housing and which movably receives the valve spool 180 is provided with suitable flow passages and preferably an orifice passage 197 in communication with branch conduit 154 which reduces the tolerance effects of orifice size.

As shown in FIG. 2B, the conduits 175 and 176 extending from the steering control valve 171 connect into opposite ends of a displacement control valve 200 to effect the positioning of a control valve spool 201 movable within the housing of the valve. The control valve 200 additionally has a pair of tank connections 202, 203 as well as connections to the conduits 48 and 50 leading to the pump control cylinders 36 and 38, previously described. Operating fluid is delivered to the control valve through a conduit 205 (FIGS. 1 and 2B) which is supplied by the charge pump 53 of FIG. 1 with the outlet conduit 56 thereof connecting into the conduit 205.

The swashplate 32 for the pump is shown in a centered condition in FIG. 2B as caused by the springs 39 and 40 within the cylinders. Assuming that a control pressure signal directed to conduit 176 provides for operation of the hydrostatic transmission in a forward direction, this will result in control pressure shifting the valve spool 201 to the left from the position shown in FIG. 2B whereby operating fluid from conduit 205 is directed to the conduit 48 and the piston 41 is caused to move to shift the swashplate 32 in a counterclockwise direction. Alternately, if the control pressure signal is delivered to conduit 175, the control pressure signal is applied to the left-hand end of the valve spool 201 to shift it to the right, as viewed in FIG. 2B, whereby operating fluid from conduit 205 is applied to the piston 42 to shift the swashplate in the opposite direction. The conduits 175 and 176, in addition to connecting into the control valve 200, extend to a shuttle valve 210. The shuttle valve 210 functions to port the highest control pressure existing in either of conduits 175 or 176 to one end of the displacement control valve for the swashplate of the motor whereby the motor swashplate always adjusts in the same direction.

A control valve 220 of the motor displacement control has a valve spool 221, with the right-hand end thereof always being sujected to the highest control pressure through a conduit 222 extending from the shuttle valve 210. The opposite end of the control valve has a conduit 223 with branch conduits 224 and 225 connected to the shuttle valve 210. The control valve 220 is of the same construction as the control valve 200, with there being a pair of tank connections and also a conduit 226 which branches off from the conduit 205 connected into the outlet from the charge pump 53 to provide operating fluid for operation of the displacement control for the motor swashplate.

Referring to the displacement control for the pump, the valve spool 201 is shown in a neutral position with the swashplate 32 in neutral position and with the position of the valve spool partially being controlled by a pivoted arm 230 which is connected to the valve spool for movement with it and which has a pair of springs 231 and 232 engaging against opposite sides of the arm and acting in opposition to each other. The null position of the valve spool with the swashplate 32 in neutral is set by rotatable adjustment of a threaded seat member 233 for the spring 232, with the rotatable adjustment either advancing or retracting the spring seat 233 to vary the compression of the spring 232 in action against the spring 231 to obtain the desired null position. Additionally, the displacement control has feedback means including a pivoted linkage 240 including an arm 241 on a fixed pivot 242 and having a seat at an end thereof for the spring 231. As the valve spool 201 is shifted, the control arm 230 is similarly shifted to create an imbalance in the springs 231 and 232. The shift of the spool results in a pivoting of the swashplate 32, which is indicated through the feedback linkage 240 to vary the compressive force on spring 231, whereby when there is again a balance in the spring forces the valve spool 201 will be in a neutral flow-blocking position. This action will be the same regardless of the direction in which the swashplate 32 is pivoted.

As stated previously, the highest control pressure is always directed through conduit 222 to the valve 220 of the motor displacement control whereby the pressure acts to shift the valve spool 221 toward the left as viewed in FIG. 2B. This valve spool has a control arm 250 movable therewith and with a pair of springs 251 and 252 engageable against opposite sides of the control arm and acting in opposition. The spring 251 has an adjustable, threaded spring seat member 253 on a fixed mounting in order to obtain a null position for the valve spool 221. Additionally, the spring 251 is stronger than the springs 231, 232 and 252 whereby the valve spool 221 is normally open to conduit 98 and will not shift in response to a control pressure until the value of that pressure exceeds a control pressure which acts to substantially fully shift the valve spool 201 of the pump displacement control valve. This provides for staging of the components of the transmission whereby the swashplate 32 of the pump which has been at neutral will move to a substantially maximum displacement prior to any movement of the motor swashplate 33. Following maximum displacement of the pump swashplate, the displacement of the motor will be reduced as the control pressure increases.

This action is shown by the graph of FIG. 4 wherein the control pressure obtained by the setting of the pressure reducing valve 125 is plotted as the ordinate and the displacement of the pump and motor are plotted as the abscissa. As the control pressure increases from ($a$) to ($b$), the displacement of the pump changes from neutral to maximum, as indicated by symbols beneath the abscissa line and at approximately the time the pump achieves full displacement, the displacement of the motor reduces progressively from a maximum to a minimum as the control pressure moves from value ($b$) to ($c$) and as shown by markings above the abscissa line.

The shuttle valve 210 has a valve spool 260 and a pair of internal passages opening to opposite ends thereof and extending to the surface of the valve spool by a pair of radial passages 261 and 262. The last-mentioned passages provide for communication of pressure in conduits 175 and 176 to the respective opposite ends of the shuttle valve spool 260 whereby the greater control pressure will act to shift the shuttle valve. Assuming that the greater control pressure is in conduit 175, the shuttle valve spool 260 will be shifted upwardly whereby the conduit 175 is placed in communication with the conduit 222. If the greater control pressure is in conduit 176, this will be directed to the upper end of the shuttle valve spool to shift the valve downwardly, with the result that conduit 176 will be placed in communication with conduit 222 leading to the control valve 220 of the motor displacement control. In either of the above situations, one or the other of the branch conduits 224 or 225 will be connected to the other of conduits 175 and 176 which will extend back to the steering control valve 171 for suitable connection to tank at the directional control valve 142.

In considering the feedback means of the motor displacement control, reference shall first be made to FIGS. 5 and 6. In order to maintain the same steer radius of a vehicle when changing ground speed while in a turn, there should be a linear relationship between the control pressure and the output speed of the transmission, as indicated in the graph of FIG. 5.

The feedback means for the motor displacement control has a cam to provide the relationship indicated by the graph of FIG. 6 between transmission speed and displacement of the motor in order to result in the linear relation between control pressure and transmission speed shown in the graph of FIG. 5. Without the cam, the relationship between pressure and speed shown in FIG. 5 would not be linear at the higher control pressures whereby it would be possible to have an indirect relation between the speeds of the two hydrostatic transmissions when one of the steering control valves 171 or 173 might be operated to have one transmission operating in a speed range different from the other. This would result in an uncontrolled relation in a turn of the vehicle.

Referring specifically to the feedback means for the motor displacement control shown in FIG. 2B, a linkage connected to the swashplate has an arm 270 connected to the swashplate which, by a link 271, pivots an arm 272 pivotally-connected to a fixed bracket 273 with a cam roller 274 on the end of the arm 272. A cam 275 pivoted on a fixed mount 276 carries a spring seat for the spring 252 and has a cam surface coacting with the cam roller 274.

The action of the cam 275 results in obtaining a relatively small change in the compression exerted on spring 252 when displacement of the motor varies near the maximum displacement range of operation of the motor, with there being a greater rate of change of compression of the spring 252 in response to a given control pressure signal when the motor is operating toward the minimal displacement range of operation. Thus as the swashplate 33 pivots counterclockwise as viewed in FIG. 2B, the cam 275 also pivots counterclockwise to reduce the compression on the spring 252 until there is a balance obtained to bring the control spool 221 to a neutral position wherein operating fluid from conduit 226 is blocked from communication with the operating cylinders 94 and 95. This balance is obtained when the control pressure acting on the right-hand end of the control spool 221 plus the force of spring 252 equals the force of the stronger spring 251 and any force resulting from pressure acting against the left-hand end of the control spool 221.

It will be obvious that the cam and cam roller relation shown in FIG. 2B could be reversed whereby the cam could be associated with the feedback linkage and the follower associated with the spring seat.

A cam, such as cam 275, designed for a hydrostatic transmission using a single variable displacement motor with a variable displacement pump, will provide the desired relation shown in FIG. 5 regardless of pump size or input speed. The only requirement is that the actual control pressure to produce full pump displacement be similar for different pump sizes. Similarly, the same cam can be used for different motor sizes as long as suitable feedback linkage is used in order to produce the relationship shown in FIG. 6.

In the control system as now described, a single control handle 100 controls components of the master control circuit to establish a uniform pressure and, therefore, a uniform speed for both of the hydrostatic transmissions as well as the direction of operation thereof. With operation of the control handle 100 and rotation of the shaft 132, the control valve 142 is appropriately positioned and either of the cam surface sections 160 and 161 of the speed-setting cam 131 controls the force of the spring of the pressure-reducing valve 125. This applies the same control pressure to both branch circuits, with each circuit having a steering control valve, namely 171 and 173. When it is desired to obtain non-uniform operation of the transmissions, either of the handles 101 or 102 may be operated to vary the control pressures applied to the displacement controls for the associated hydrostatic transmission. The relation of rotation of the handle 100 to the establishment of control pressures by the pressure-reducing valve 125 is shown in the graph of FIG. 3 wherein the control pressure values (a), (b) and (c) correspond to those given in FIG. 4. It will be noted that initial rotation of the handle determines the direction of operation with the magnitude of rotation of the handle determining the control pressure and, therefore, the speed of the hydrostatic transmissions.

As described previously, the steering control valve 171 is shown in one limit position and, as the handle is moved, the valve spool progressively may be moved toward the other limit position and during movement will meter part of the control pressure fluid to tank through connection back to the directional control valve 142, with full movement of the steering control valve to an opposite limit position actually reversing the direction of control pressure fluid to the displacement controls.

When the steering control valve spool 180 is shifted to meter the control pressure, there is a pressure established in either of conduits 175 or 176 which is connected to tank by directional control valve 142 because of the orifices 197 and 195, respectively, which restrict flow to tank. This establishment of pressure along with a reduction of a control pressure upsets the balance on the displacement control to have the hydrostatic transmission operate at a reduced speed.

The steering control valve 173 has the output conduits 177 and 178, referred to previously, which correspond to the conduits 175 and 176 for the steering control valve 171. The conduits 177 and 178 connect into a displacement control, the same as shown in FIG. 2B for the pump and motor of the second hydrostatic transmission. Corresponding parts of the two steering control valves have been given the same reference numerals.

The horsepower control valve 140 shown in FIG. 2A has a valve spool 400 movable within a sleeve 401 fitted in a bore of the housing 402 of the valve. One end of the valve spool has a piston 405 engaged on its upper side, as shown in FIG. 2A, by a pin 406 movable in the housing and urged downwardly by a spring 407 which can have its force adjusted by an adjusting mechanism 408. There are four areas associated with the valve spool subject to pressure for obtaining the desired control. The lower end of the valve spool represents an area A-1, the upper side of the piston 405 represents an area A-2, the upper end of the pin 406 represents an area A-3, and the lower side of the piston 405 represents an area A-4.

A conduit 410 branching from the outlet conduit 111 of the control pump extends to the valve bore and fluid pressure therein acts against the area A-4 at the underside of the piston 405 with this pressure representing engine speed since the control pump 110 supplies a volume of oil proportional to engine speed to the variable orifice valve 112. The pressure delivered to A-4 is identified as $p_1$. A pressure $P_2$ is applied to area A-2 through a conduit 415 branching from the conduit 118 having the regulated pressure $P_R$.

A control pressure $P_3$ set by the pressure reducing valve 125 is directed to the horsepower control valve 140 through the line 127 as previously described. A modified control pressure $P_4$ is selectively set by the horsepower control valve and delivered to the directional control valve 142 through the conduit 141.

The modified control pressure $P_4$ may be at the same value as control pressure $P_3$ or a lesser value.

The conduit 141 connects through the sleeve 401 of the horsepower control valve and, subject to the position of the valve spool 400, with a passage 430 in the valve housing 402 which extends upwardly (as viewed in FIG. 2A) to a lateral passage 431 communicating with the bore receiving the pin 406. Thus, the pressure $P_4$ existing in conduit 141 and established by the shifting of the horsepower control valve is applied to the area A-3 of the pin 406. The passage 430 also extends in the opposite direction to communicate with an enlarged part 435 thereof which receives an orifice plug 436 having a flow restricting orifice. The enlarged part 435 of the passage communicates by a connecting passage 437 with the lower end of the valve bore for application of pressure to the area A-1 of the valve spool. The passage 437 also communicates with an additional bore in the housing 402 of the valve, with this bore having a first section to receive an accumulator spring 440 and a second section to receive an accumulator piston 441. A passage 442 in the housing connects the upper side of the accumulator piston 441 with the conduit 415 whereby the upper side of the piston is exposed to the constant pressure $P_2$.

Adjustment means 445 is provided for adjusting the force of the accumulator spring 440.

The pressure $P_1$ in conduit 410 is subject to over pressure relief by means of a pressure relief valve 450 having an inlet connected to the conduit 410 and a normally closed connection to tank.

In operation, control fluid (oil) delivered by the control pump 110 passes through the variable orifice valve 112 to create a differential pressure with respect to $P_1$ and $P_2$ which increases and decreases as engine speed increases and decreases. The pressure $P_2$ is held constant by the pressure regulator 120 and thus the pressure $P_1$ in conduit 410 becomes an indicator of engine speed. When engine speed is above a predetermined set speed, the horsepower control valve 140 allows an unimpeded control pressure signal $P_3$ to pass from the pressure reducing valve 125 through the directional control valve 142 to the controls for the hydrostatic transmissions. When engine speed drops below the preset level, the horsepower control valve 140 acts to block the pressure $P_3$ delivered thereto from the pressure reducing valve 125 and to lessen the control pressure $P_4$ to resultingly modify the hydrostatic transmissions. This change in the hydrostatic transmission is by modifying displacement of the pump and/or motor thereof to reduce the torque load on the prime mover engine allowing engine speed to approach said speed. As previously described, the variable orifice valve 112 is set by the throttle setting of the engine. The variable valve determines the engine speed at which the horsepower control valve 140 will operate.

The horsepower control valve 140 is, in effect, actuated to a controlling position by a changed relation of pressures $P_1$ and $P_2$ and biased by the pressure $P_4$ which is applied to area A-3 at the upper end of the pin 406 as well as a pressure $P'_4$ which is the pressure existing beneath the orifice plug 436, as shown in FIG. 2A, and which acts on the area A-1 of the valve spool. Bias is also applied by the spring 407.

When the loads on the prime mover engine are insufficient to cause engine speed to drop below a preset value, the pressure $P_1$ acting on area A-4 causes the valve spool 400 to be opened sufficiently to not modify the control pressure signal $P_3$ whereby the outputted control pressure signal $P_4$ equals $P_3$. In this condition, the operator of the control has complete command of the setting of the control pressure $P_4$ by operation of the manual control handle 100 which sets control pressure $P_3$.

When the prime mover engine is sufficiently loaded to cause the engine speed to drop below a preset value, the pressure $P_1$ decreases whereby an imbalance of forces results causing the valve spool 400 to shift downwardly. Resultingly, a land 460 on the valve spool moves to a position slightly beneath the port in sleeve 401 which communicates with the output conduit 141 whereby oil may pass from conduit 141 to a tank connection 461 to the valve 140 to cause a decrease in the output control pressure $P_4$. The reduction in $P_4$ continues until the reduction of the force acting on area A-3 at the top of pin 406 causes the valve spool 400 to be recentered whereby the land 460 stops the flow of oil to the tank port 461. This action is substantially instantaneous with pressure $P_4$ rising and falling with pressure $P_1$.

The fall in the pressure $P_4$ simultaneously causes a flow of oil through the orifice plug 436 from the passage 437 to the passage 430 to cause a slow decrease in pressure $P'_4$ which, in a steady-state condition, is the same pressure as $P_4$. A reduction in pressure $P'_4$ thus reduces the force acting on area A-1 of the valve spool 400 and permits an additional downward offsetting of the valve spool 400 and a further fall in the pressure $P_4$. The aforesaid reductions in a modified control pressure $P_4$, which is applied to the displacement controls of the hydrostatic transmissions, results in either a decrease in hydraulic pump displacement or an increase in the displacement of the transmission motor, thus decreasing the load on the engine and the engine is eventually driven to a new equilibrium setting as the change in transmission displacement unloads the engine.

Following the operation described immediately above, when a reduction in the load causes the engine speed to increase, there is a resulting rise in pressure $P_1$. This rise acting on the area A-4 shifts the valve spool 400 upwardly to shift the land 460 upwardly whereby conduits 127 and 141 are placed in flow communication to cause modified control pressure $P_4$ to rise toward the value of the control pressure $P_3$. The rise in pressure $P_4$ acts upon the area A-3 at the upper end of the pin 406 and tends to shift the valve spool 400 downwardly and to have the land 460 positioned as shown in FIG. 2A to close the valve. The rise in the output control pressure $P_4$ causes the hydraulic pump displacement to be increased or hydraulic motor displacement to be decreased, thus loading the engine and causing engine speed to decrease toward an equilibrium setting. The rise in the output control pressure $P_4$ also causes flow through the orifice plug 436 from the passage 430 to the passage 437 with a slow increase in pressure $P'_4$. This latter pressure acting on the area A-1 of the valve spool causes an upward shift of the valve spool for a further rise in pressure $P_4$ toward the value of pressure $P_3$. The engine speed eventually attains a new equilibrium setting and remains there until a change in engine loading again changes engine speed.

The actual rate of change in pressure $P'_4$ is a result of the accumulator piston 441 and the accumulator spring 440. The upper end of the accumulator piston 441 is acted upon by pressure $P_2$. Flow through the orifice plug 436 causes the accumulator piston 441 to move with the accumulator spring 440 and with the pressure $P'_4$ being determined by the position of the piston 441.

The accumulator-orifice combination provides, in effect, a means of delaying the application of the pressure $P'_4$. The slow application of changes in pressure $P'_4$ helps retain system stability while improving the accuracy of the steady-state engine speed. The diameter of the orifice, diameter of the accumulator piston and the spring rate of the spring 440 determine an accumulator time constant which determines the time required for the system to reach a steady-state condition. In considering the design parameters, the making of the orifice in the orifice plug 436 small and the diameter of the accumulator piston 441 large, or the spring rate of the spring 440 low, lengthens the time constant and improves system stability. The adjustment mechanism 445 for the spring 400 is used to determine the pressure range over which the accumulator is operative. If the accumulator piston 441 is biased upwardly against the end wall of the housing bore, the pressure $P'_4$ will equal the pressure $P_4$ and system response is improved. Optionally, rather than having the adjustment mechanism 445, the horsepower control valve may be initially assembled with suitable shims positioned to set the force of the spring 440 and without the possible modification of this spring force in the field.

In the embodiment shown in FIG. 2A, the pressure $P_2$ in conduit 415 is always greater than pressure $P'_4$, therefore, the accumulator piston 441 can always be kept in contact with the spring 440, thus assuring proper operation of the accumulator.

The adjusting mechanism 408 functions to set the force of the spring 407 acting on the pin 406 and is adjustable to set the operating speed of the engine. This spring, in bearing against the pin 406, creates a force which must be equalized by the pressure $P_1$ acting on the area A-4. Increasing the load of spring 407 causes the engine set speed to rise.

The horsepower control valve is constructed to have a ratio of area A-4 to area A-3, which are subjected to pressures $P_1$ and $P_4$ respectively, determine the amount that pressure $P_4$ outputted from the horsepower control valve changes for a given change in the pressure $P_1$. The relation between $P_1$ and $P_4$ is affected only by physical areas subjected to pressure and therefore the pressure $P_4$ outputted from the horsepower control valve is not affected by such uncontrollable variables as oil viscosity, oil temperature, or port tolerances in the horsepower control valve. The actual ratio between areas A-4 and A-3 may be varied with the ratio selected being determined by the requirements of the system with which the valve is used. These requirements include stability to control hunting of the control system and also accuracy with respect to changes in engine speed responsive to load. A high ratio can provide good engine speed accuracy but with some sacrifice in stability.

An additional ratio of areas involved in control is the ratio of area A-1 to area A-3 and which are subjected to pressures $P'_4$ and $P_4$, respectively. The ratio of these two areas determines the deviation of engine speed from the desired set speed at steady-state conditions as load as applied to the engine. A ratio of 1:1 allows the engine to run at constant speed regardless of the load imposed upon the system. As shown in FIG. 2A, the ratio is less than 1:1 and thereby the engine speed will drop as load is applied with system stability being improved.

If in an application of the control it is desired to have the engine speed rise as load is applied, then the area ratio should be greater than 1:1.

The control disclosed herein controls engine speed. However, it has the capability to function as a feedback controller for any desired variable in a hydrostatic transmission system. The improvement disclosed herein provides for simply sensing the level of a pressure difference between $P_1$ and $P_2$, with the bias imposed by the additional force relations, to change an outputted pressure $P_4$ from a horsepower control valve in a manner to bring the pressure difference between $P_1$ and $P_2$ to a preselected level. Other signals at opposite sides of the piston 405 would enable control of transmission output speed or working pressure of the main transmission loop.

A modified form of the horsepower control valve 140 is shown in FIG. 7 and is generally identified by the reference numeral 140'. The modified form of the valve differs primarily in the arrangement of the accumulator and therefore those parts of the horsepower control valve shown in FIG. 7 corresponding to those shown in the valve of FIG. 2A as well as conduits connecting thereto are given the same reference numeral with a prime affixed thereto.

In the embodiment of FIG. 7, an accumulator spring 500 is positioned in a bore 501 of the valve housing 402' above accumulator piston 502. The portion of the bore housing the spring is connected to sump through a tank passage 503. The opposite end of the accumulator piston 502 is subject to the pressure $P'_4$ through the passage 505 which connects with the passage 437'. This arrangement of the accumulator permits the use of a less highly stressed spring 500. This requires careful adjustment of the preload of the spring 500 to insure proper operation of the accumulator at low values for pressure $P'_4$. In this instance, the use of shims 510 is shown and a desired number can be used in order to assure the careful preset adjustment of the spring preload.

In a horsepower control subject only to a pressure relation between $P_1$ and $P_2$, there will be a substantial change in the outputted control pressure $P_4$ over a period of time if the engine speed drops a small amount below a preset value. The application of the outputted control pressure $P_4$ to the valve spool of the horsepower control valve as a bias provides added tolerance in the control whereby pressure $P_4$ will not drop as rapidly as engine speed varies a small amount from preset value. There will still be a large drop in pressure $P_4$ if there is a large change in engine speed. The additional bias applied to the valve spool of the horsepower control valve by the pressure $P'_4$ functions to give an added increase in speed of the engine with a slight further drop in the outputted control pressure $P_4$. The utilization of $P'_4$ pressure acting on area A-1 functions to bring the engine back toward the preset rate speed for maximum horsepower.

If the vehicle is moving straight ahead, the action of the horsepower control value will result in equal, but reduced control pressures on both hydrostatic transmissions to keep the vehicle moving on a straight path, but at a lower ground speed. If the vehicle is in a steer mode, a reduction of control pressure by the valve will reduce the control pressures at each hydrostatic transmission proportionally.

I claim:

1. A control for a hydrostatic transmission having a pump, a motor, a charge pump drivable by a prime mover and a displacement control associated with one of the pump and motor and including means subjected to a control pressure for setting the transmission speed, a circuit for establishing the control pressure of a control hydraulic fluid including a control pump drivable by the prime mover and with a pressure output corresponding to the speed of the prime mover, and means for modifying the operation of the hydrostatic transmission in response to load imposed on the prime mover to maintain the prime mover at nearly constant speed including a valve in said circuit positionable in response to the pressure output of the control pump for controlling the value of the control pressure uniformly regardless of uncontrollable variables such as viscosity and temperature of the hydraulic fluid.

2. A control as defined in claim 1 including accumulator means associated with said valve to reduce the speed of operation of the valve and retain stability of control by minimizing hunting.

3. A control as defined in claim 1 wherein said valve is a three-way valve with a pair of opposed surfaces subjected to the output pressure of the control pump and a set regulated pressure downstream of the control pump, respectively, for positioning of said valve to set the value of the control pressure, and means associated with the valve for also subjecting the valve to the control pressure to further decrease the control pressure whereby the load on the prime mover is further reduced and the prime mover may return toward a constant speed value.

4. A control for a hydrostatic transmission having a pump, a motor, a displacement control associated with one of the pump or motor and including means subjected to a control pressure for setting the transmission speed, a circuit for establishing the control pressure of a control hydraulic fluid including a control pump drivable by a prime mover and with a pressure output corresponding to the speed of the prime mover, and means for modifying the operation of the hydrostatic transmission in response to load imposed on the prime mover to maintain the prime mover at nearly constant speed including a horsepower control valve in said circuit having a valve spool with opposed areas subject to the output pressure of the control pump which indicates speed of the prime mover and to a set regulated pressure, respectively, said valve spool being positionable to control the value of said control pressure and with a decrease in said output pressure causing the valve spool to shift to reduce the control pressure, and means for subjecting the valve to the control pressure established by the valve for setting a force to further position the valve to set the reduced control pressure.

5. A control as defined in claim 4 wherein said means for subjecting the valve to the control pressure established by the valve includes additional opposed areas associated with the valve and in communication with the reduced control pressure, and means for delaying the application of a change in control pressure to one of said additional opposed areas to stabilize the control and improve accuracy.

6. A control as defined in claim 5 wherein said means for delaying the application of a change of control pressure includes a flow passage in said valve between said one additional area and a connection to a line carrying the control pressure fluid, an orifice in said flow passage, and an accumulator connected to said one additional area.

7. A control as defined in claim 6 wherein said one additional area has a cross-section greater than the other of said additional areas.

8. A control as defined in claim 5 including an adjustable spring means acting on said valve in opposition to the output pressure of the control pump to set the operating speed of the prime mover.

9. A control for a hydrostatic transmission having a variable displacement pump, a variable displacement motor, a charge pump drivable by a prime mover and a pair of displacement controls associated one with each of the pump and motor and each including means subjected to a control pressure for setting the transmission speed, a control circuit for establishing the control pressure including a control pump drivable by the prime mover, a variable orifice valve connected to the outlet of the control pump to establish a pressure $P_1$ ahead of the variable orifice valve and a pressure $P_2$ downstream of the last-mentioned valve, means including a settable pressure reducing valve for reducing the pressure $P_2$ to a control pressure $P_3$, and a horsepower control valve connected to said pressure reducing valve downstream of said pressure reducing valve by an input conduit to receive said control pressure $P_3$ and deliver through an output conduit a modified control pressure $P_4$ when the prime mover speed drops below a preset value comprising, a tank port, a valve spool having a piston with a land for controlling the communication between said output conduit and either of said tank port or the input conduit, means including a piston on said land having opposed areas subjected to said pressures $P_1$ and $P_2$ respectively, whereby a reduction in pressure $P_1$ shifts the valve spool to connect the output conduit to the tank port, a pair of additional opposed areas associated with said valve spool and subjectable to pressure, means for applying said modified control pressure $P_4$ to said additional opposed areas with a time delay in any change of modified control pressure $P_4$ as applied to one of said additional areas whereby an imbalance of forces resulting from a change in pressure $P_4$ causes a shift of said valve spool.

10. A control as defined in claim 9 wherein said means for delaying a change in modified control pressure includes a flow restricting orifice, an accumulator piston, and a spring acting on the accumulator piston.

11. A control as defined in claim 10 including means wherein said accumulator piston is urged against the spring by the constant pressure $P_2$ and the modified control pressure acts on the accumulator piston in the same direction as the spring.

12. A control as defined in claim 10 including means wherein said spring acts on the accumulator piston in opposition to the modified control pressure.

* * * * *

UNITED STATES PATENT AND TRADEMARK OFFICE
CERTIFICATE OF CORRECTION

PATENT NO. : 3,885,388
DATED : May 27, 1975
INVENTOR(S) : STANLEY W. CRULL

It is certified that error appears in the above-identified patent and that said Letters Patent are hereby corrected as shown below:

Column 17, line 22, "greater" should read --smaller--.

In Fig. 2A of the drawings, the pin 406 and the bore in which it moves should be of a larger diameter than the lands on the valve spool 400 and the pin 406 should be coaxial with the valve spool 400;

In Fig. 7 of the drawings, the pin 406' and the bore in which it moves should be of a larger diameter than the lands on the valve spool 400' and the pin 406' should be coaxial with the valve spool 400'.

Signed and Sealed this

Thirteenth Day of December 1977

[SEAL]

Attest:

RUTH C. MASON
Attesting Officer

LUTRELLE F. PARKER
Acting Commissioner of Patents and Trademarks